Patented Oct. 28, 1952

2,615,880

UNITED STATES PATENT OFFICE 2,615,880

COPOLYMERS OF VINYLIDENE CYANIDE WITH ALKYL ACRYLATES

Vernon L. Folt, Akron, Ohio, assignor to The B. F. Goodrich Company, New York, N. Y., a corporation of New York No Drawing. Application October 27, 1950, Serial No. 192,636

8 Claims. (Cl. 260—78.5)

This invention relates to the preparation of novel copolymers of vinylidene cyanide with alkyl esters of acrylic acid, which copolymers are useful resinous materials, being especially valuable in the preparation of filaments, films and molded articles.

In U. S. Patents 2,476,270 and 2,502,412, to Alan E. Ardis, and 2,514,387, to Harry Gilbert, novel methods for the preparation of monomeric vinylidene cyanide are disclosed. In a copending application, Serial No. 11,336, filed February 26, 1948, methods for the preparation of useful homopolymers of vinylidene cyanide are disclosed.

Monomeric vinylidene cyanide is a clear liquid at room temperature and a crystalline solid at 0° C.; it melts in the range of 6.0° to 9.7° C. depending on purity, with purest samples melting at 9.0 to 9.7° C. and it boils at 40° C. at a reduced pressure of 5 mm. of mercury. It is quite unstable because of its extreme sensitivity to water, undergoing on contact with water at room temperature an instantaneous homopolymerization reaction to give a solid water-insoluble resin. When it is allowed to stand at room temperature in admixture with butadiene-1,3, it reacts therewith to give solid 4,4-dicyanocyclohexene.

It has now been discovered that monomeric vinylidene cyanide of the above physical and chemical properties will copolymerize with alkyl esters of acrylic acid in the presence of a free radical catalyst.

The alkyl acrylates which are polymerized with vinylidene cyanide in accordance with the present invention possess the structure

CH$_2$=CHCOOR wherein "R" is an alkyl radical. Included within this class of compounds are: methyl acrylate, ethyl acrylate, propyl acrylate, isopropyl acrylate, butyl acrylate, isobutyl acrylate, amyl acrylate, hexyl acrylate, 2-ethyl hexyl acrylate, heptyl acrylate, octyl acrylate, isononyl acrylate, 3,5,5-trimethyl hexyl acrylate, decyl acrylate, dodecyl acrylate, and the like, with the particularly preferred alkyl acrylates being those in which the radical "R" contains from one to ten carbon atoms.

The polymerization itself may be carried out in several different ways. For example, one preferred method consists simply in heating a mixture of the monomers and polymerization catalyst, without the use of a solvent or other liquid medium for the monomers, to effect the polymerization. The polymerization occurs readily at temperatures of about 20° C. to 100° C., the copolymer forming generally as a white resinous powder of small particle size.

A second method of polymerization consists in first dissolving the vinylidene cyanide and alkyl acrylate in benzene or other liquid aromatic solvent, such as, toluene, methyl toluene, trichloro benzene, or the like, preferably free from impurities which initiate the ionic polymerization of the monomer and in an amount such that the solvent comprises approximately 30% to 80% by weight of the total solution. A polymerization catalyst is included in the solution and the resulting mixture is maintained at the desired temperature, whereupon polymerization occurs to form the desired copolymer. The copolymer thus formed may be separated from the polymerization medium simply by filtering, or, if desired, the solvent may be removed by evaporation. Also, the polymerization may be effected at temperatures as low as 0° C. or lower, or as high as 100° C. or even higher, provided a catalyst is utilized which will dissociate into free radicals at the polymerization temperature.

The respective quantities of the alkyl acrylate and vinylidene cyanide in any polymerization charge are not critical since a useful copolymer is obtained regardless of the amount of either monomer in the charge, as will be demonstrated in the examples hereinbelow. The amount of vinylidene cyanide in the monomer charge may be as low as 0.1 mole per cent or as high as 99 mole per cent while obtaining copolymers markedly different from straight homopolymers of either the alkyl acrylate or the vinylidene cyanide.

It is to be understood, of course, that regardless of the polymerization method utilized, the polymerization should be stopped before either of the monomers is entirely consumed, in order that true copolymer will be obtained. Otherwise, when either of the monomers is completely used up, the product will contain straight polymer obtained by polymerization of the remaining monomer. Accordingly, it is often desirable to add, continuously or intermittently, fresh quantities of one or both of the monomers, and also of catalyst and solvent, if desired, to the polymerization mixture during the course of the polymerization, thus taking fullest advantage of the capacity of the equipment and in effect operating a continuous or semi-continuous process.

The catalyst which is used in the polymerization process is preferably a peroxygen compound, such as, silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, tetralin peroxide, and the like. In general, from 0.01 to 2.0% by weight of the catalyst, based on the weight of the monomers, is utilized, although smaller or larger amounts may be utilized, if desired.

The following examples illustrate the preparation of copolymers of vinylidene cyanide with alkyl acrylates in accordance with this invention, but are not to be construed as a limitation upon the scope thereof, for there are, of course, numerous possible variations and modifications.

EXAMPLES I TO VI

A series of six vinylidene cyanide-n-butyl acrylate copolymers is prepared by mixing varying amounts of both monomers with 0.15% (based on the total weight of the two monomers) of o,o'-dichlorobenzoyl peroxide and maintaining the resulting mixtures at a temperature of about 50° C. for a period of several hours. The hard, resinous copolymer obtained at the end of this period is then analyzed to determine its composition. The mole per cent of vinylidene cyanide in the polymerization charge and the mole per cent of vinylidene cyanide in the resulting copolymer are recorded in the following table:

Table I

| Mole Percent Vinylidene Cyanide Charged | Mole Percent Vinylidene Cyanide in Copolymer |
| --- | --- |
| 15.4 | 66.7 |
| 22.5 | 78.9 |
| 35.5 | 88.9 |
| 62.1 | 89.8 |
| 83.1 | 91.8 |
| 89.1 | 92.0 |

EXAMPLES VII TO XIV

Examples I to VI are repeated utilizing methyl acrylate in place of the n-butyl acrylate. A hard, resinous copolymer which is completely insoluble in acetone is obtained. The pertinent data is tabulated below:

Table II

| Example | Mole Percent Vinylidene Cyanide in Charge | Time (Hours) | Percent Conversion | Percent Nitrogen in Copolymer | Mole Percent Vinylidene Cyanide in Copolymer |
| --- | --- | --- | --- | --- | --- |
| VII | 5.488 | 33.5 | 6.74 | 13.01 | 38.540 |
| VIII | 5.488 | 33.5 | 6.36 | 11.15 | 33.201 |
| IX | 10.919 | 33.5 | 5.94 | 14.59 | 43.033 |
| X | 16.295 | 33.5 | 5.30 | 18.01 | 52.623 |
| XI | 26.886 | 33.5 | 2.87 | 20.69 | 60.016 |
| XII | 52.453 | 27.0 | 5.20 | 23.45 | 67.515 |
| XIII | 76.796 | 27.0 | 3.50 | 25.34 | 72.587 |
| XIV | 90.849 | 29.0 | 2.50 | 29.00 | 82.265 |

When other alkyl acrylates selected from those disclosed hereinabove are substituted for n-butyl acrylate or methyl acrylate in the above examples, the copolymers obtained are also hard, resinous materials which are completely insoluble in acetone. Likewise, when the polymerization is carried out according to the other methods described hereinabove, or utilizing other of the peroxygen catalysts disclosed, excellent results are achieved. From the examples it is found that copolymers of alkyl acrylates with vinylidene cyanide are more thermoplastic than straight homopolymers of vinylidene cyanide and yet are harder than straight polymers of the alkyl acrylates, thus demonstrating the unique properties obtained by copolymerizing the two types of monomers of the present invention.

Although specific examples of the invention have been herein described, it is not intended to limit the invention solely thereto, but to include all of the variations and modifications falling within the spirit and scope of the appended claims.

I claim:

1. A two component copolymer of monomeric vinylidene cyanide and an alkyl ester of acrylic acid, said copolymer being a resinous, heat-softenable solid which is insoluble in acetone, the monomeric vinylidene cyanide entering into said copolymer to produce vinylidene cyanide units being a liquid at room temperature and a crystalline solid at 0° C. having a melting point when in purest form of substantially 9.0° to 9.7° C. and being characterizable chemically by the ability to undergo on contact with water at room temperature an instantaneous homopolymerization reaction to give a solid, water-insoluble resin and by the ability to react at room temperature with butadiene-1,3 to give solid 4,4-dicyanocyclohexene.

2. The copolymer of claim 1 wherein the alkyl radical of the alkyl ester of acrylic acid contains from 1 to 10 carbon atoms.

3. The copolymer of claim 1 wherein the alkyl ester of acrylic acid is n-butyl acrylate.

4. The copolymer of claim 1 wherein the alkyl ester of acrylic acid is methyl acrylate.

5. The method which comprises admixing liquid monomeric vinylidene cyanide, said monomeric vinylidene cyanide being characterizable chemically by the ability to undergo on contact with water at room temperature an instantaneous homopolymerization reaction to give a solid, water-insoluble resin and by the ability to react at room temperature with butadiene-1,3 to give solid 4,4-dicyanocyclohexene, with an alkyl ester of acrylic acid, and with a peroxygen catalyst in an amount from 0.01 to 2.0% by weight of the monomers, and maintaining the resulting mixture at a temperature of from 0° C. to 100° C., thereby to form a solid resinous, two component, acetone insoluble copolymer of vinylidene cyanide with said alkyl ester of acrylic acid.

6. The method of claim 5 wherein the alkyl radical of the alkyl ester of acrylic acid contains from 1 to 10 carbon atoms.

7. The method of claim 6 wherein the alkyl ester of acrylic acid is n-butyl acrylate and the peroxygen catalyst is o,o'-dichlorobenzoyl chloride.

8. The method of claim 6 wherein the alkyl ester of acrylic acid is methyl acrylate and the peroxygen catalyst is o,o'dichlorobenzoyl peroxide.

VERNON L. FOLT.

REFERENCES CITED

The following references are of record in the file of this patent:

UNITED STATES PATENTS

| Number | Name | Date |
| --- | --- | --- |
| 2,396,785 | Hanford | Mar. 19, 1946 |
| 2,466,395 | Dickey | Apr. 5, 1949 |